United States Patent [19]

Lemke

[11] Patent Number: 4,616,724
[45] Date of Patent: Oct. 14, 1986

[54] STEERING MECHANISM FOR ALL SEASON VEHICLE

[75] Inventor: Gary Lemke, Marcell, Minn.

[73] Assignee: ASV Corporation, Marcell, Minn.

[21] Appl. No.: 715,205

[22] Filed: Mar. 25, 1985

[51] Int. Cl.[4] .............................................. B62D 11/04
[52] U.S. Cl. ............................... 180/6.48; 74/471 XY;
74/473 R; 180/9.1; 180/333
[58] Field of Search ...................... 180/6.2, 6.24, 6.26,
180/6.3, 6.32, 9.1, 9.21, 9.28, 9.3, 9.34, 9.36,
9.38, 6.48, 333, 336; 74/720.5, 473 R, 471 XY

[56] References Cited

U.S. PATENT DOCUMENTS

| | | | |
|---|---|---|---|
| 3,572,033 | 3/1971 | Tolley | 74/473 R X |
| 3,581,497 | 6/1971 | Krumholz | 180/6.48 X |
| 3,876,020 | 4/1975 | Barsby | 180/6.48 |
| 3,934,485 | 1/1976 | Ratliff | 74/473 R |
| 4,541,300 | 9/1985 | Kwiatkowski et al. | 74/473 R X |

*Primary Examiner*—John J. Love
*Assistant Examiner*—Mitchell J. Hill
*Attorney, Agent, or Firm*—Schroeder & Siegfried

[57] ABSTRACT

An all seasons vehicle has a hydraulic control circuit that is used to make the vehicle highly maneuverable in which the rear treads are controllable through a speed control driving or controlling the speed of each of the hydraulic motors from a pair of hydraulic pumps connected to the motors in proportion to the position of a control element that is changed through the steering wheel of the vehicle. The control over the hydraulic motors may be increased or decreased by overriding the position of the control element and increasing the hydraulic flow of fluid to one motor or the other without interfering with the direction being imparted to the vehicle.

20 Claims, 4 Drawing Figures

STEERING MECHANISM FOR ALL SEASON VEHICLE

BACKGROUND OF THE INVENTION

The present invention relates to a means of driving the rear treads on an all season vehicle and particularly in accordance with a direction imparted to the front steering mechanism.

The present invention makes use of a hydraulic control system for imparting a different speed relationship to each tread while maintaining a correct steering direction for the vehicle. The mechanism responds to the hydraulic system in both forward and rearward movement and also reacts properly in a neutral position. While in a normal driving position, the steering mechanism of the vehicle will turn the front steering elements in the proper direction and produce a proper driving relationship to the rear treads to track that front steering mechanism. When it is desirable to overcome the control position imparted to the two rear treads, a deadman switch may be depressed which permits a rotational movement of the deadman stick causing the valves directing the hydraulic flow to be oriented to give an exaggerated flow position.

DESCRIPTION OF THE PRIOR ART

This invention is an improvement over prior art such as disclosed in U.S. Pat. No. 3,362,493 entitled driving and steering system for vehicles. That disclosure is directed to a driving and steering mechanism having some 11 bell cranks or arms and additional cams, all for the purpose of providing driving wheels that supply motor power as required to follow the path of the steered wheels.

Several other patents, such as U.S. Pat. Nos. 2,651,377 and 3,153,911 make use of a lost motion device so that when the wheels direct a greater portion of fluid to the appropriate drive wheel it is at the outside of the turn when power is applied, thus resulting in a form of power assisted steering. With this arrangement, there is no assist to steering until a substantial turn is undertaken.

It is therefore a general object of this invention to provide an improved control for steering an all season vehicle.

It is yet another object of this invention to provide a control that may be overridden to increase the maneuverability of an all seasons vehicle.

It is still another object of this invention to provide a control mechanism that controls the hydraulic valves as well as the steering mechanisms simultaneously.

It is a further object of this invention to provide hydraulic override means for steering an all seasons vehicle when required.

It is still a further object of this invention to provide direct control to the steerable means independant of the position of the tread control means.

It is another object of this invention to provide an improved steering mechanism for an all seasons vehicle using either skiis or wheels at the front thereof.

It is yet another object of this invention to provide a hydraulic control producing steering movement of the tread means in which flow of the hydraulic fluid is regulated to the tread motors.

BRIEF DESCRIPTION OF THE DRAWINGS

A detailed description of one preferred embodiment of the STEERING MECHANISM FOR ALL SEASON VEHICLE is hereinafter described with specific reference being made to the drawings in which:

FIG. 1 discloses an all season vehicle 20 that further includes a motor compartment 21, rear treads 22 and a delivery compartment 23. The forward part of the vehicle includes a cab 24, a steering wheel 25 and includes at the front thereof, either a pair of wheels 26 or a pair of skiis 27. Cab 24 is pivoted at the front portion thereof and tilts about a horizontal transverse axis to expose the mechanism beneath the cab and to the immediate rear of cab 24.

Figure 1:
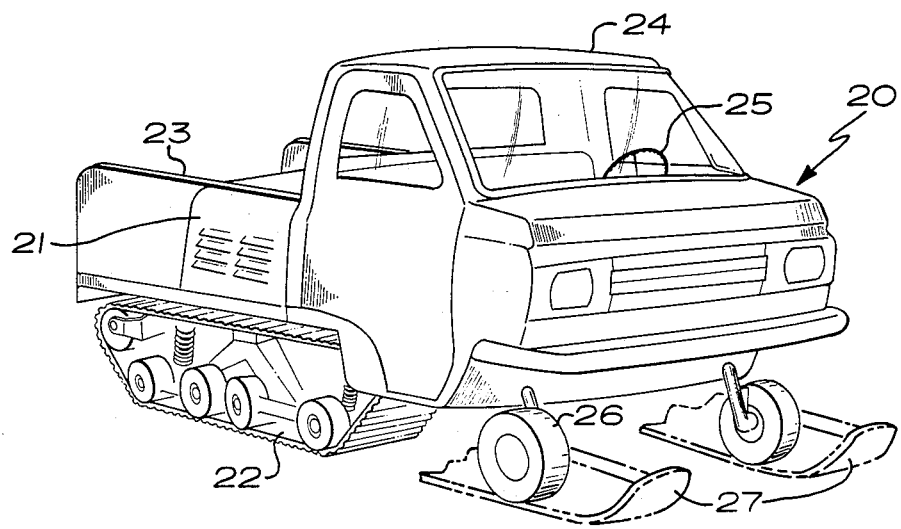
FIG. 1 is a perspective view of an all seasons vehicle embodying my invention.

Normal means for driving a tread on an all-seasons-vehicle is to supply power to the tread through a hydrostatic drive and if it is desirable to turn to the left, the left tread is driven at a lower speed to produce a turning motion to the left. However, where skiis or wheels are used at the front of the vehicle, it is desirable to couple the steering mechanism to the control of the treads and thus provide a more steerable vehicle. This invention accomplishes this purpose wherein a hydrostatic control arm 35 appears in the center of the floorboards in cab 24. In the ordinary control of the mechanism, steering wheel 25 is rotated in either direction and supplies hydraulic power to a hydraulic cyhlinder 37 that has its piston connected to a tiebar 38 in linkage to a normal arrangement to produce a rotational effect of wheels 26. A motor 40 supplies power to a pair of hydraulic transmitters or pumps 41 and 42 to drive the vehicle during use. A pair of hydraulic lines 43 and 44 extend from left pump 41 to a pair of ports 43a and 44a on receiver or hydraulic motor 45 which has an output shaft 46 to drive tread mechanism 22. A pair of hydraulic lines 50 and 51 are connected from the right pump 42 to a pair of ports 50a and 51a on receiver or hydraulic motor 53 to produce a rotational drive for a shaft 54. Thus, whenever a valve 41a on left pump 41 is operated to a first position, the rotation will cause movement of the vehicle forwardly and when moved to another position in the opposite direction, tread 22 will turn in a reverse manner. In a similar construction, a valve 42a is connected to right pump 42 and will thus cause motor 53 to rotate either forwardly or in reverse depending on the position of valve 42a. Connected to valve 41a, is a cable 55 and connected to valve 42a is a cable 56, both valves directing the amount and direction of flow of the hydraulic fluid.

Figure 3:
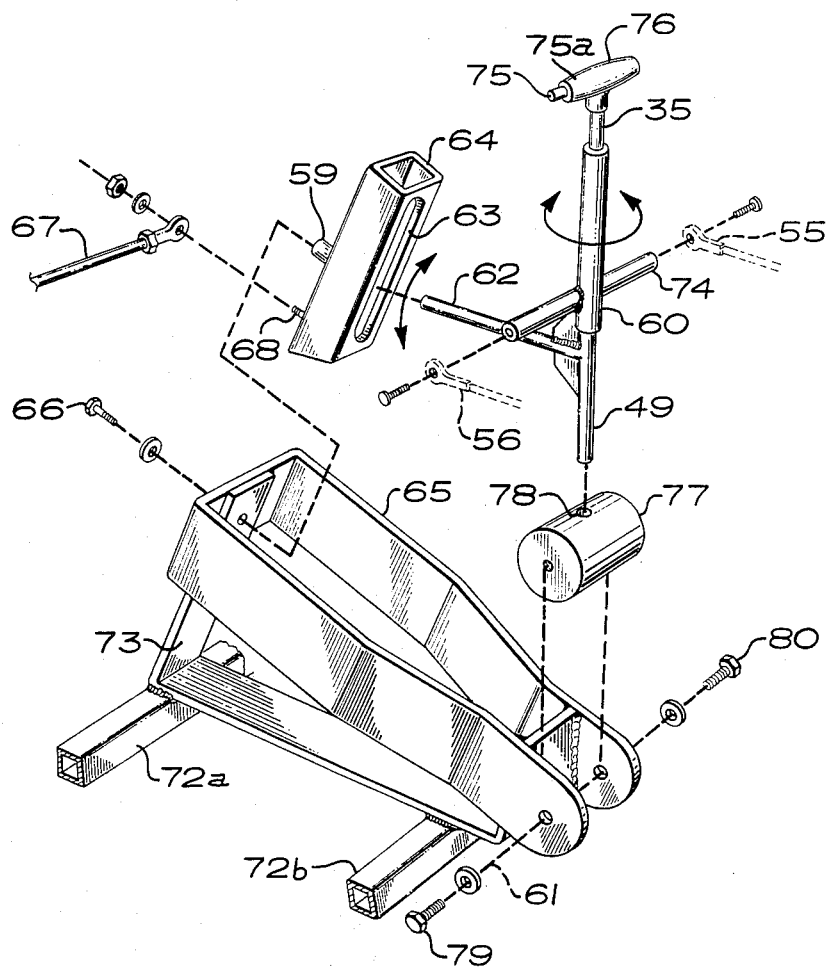
FIG. 3 is an exploded view of the control element of my invention.
Figure 2:
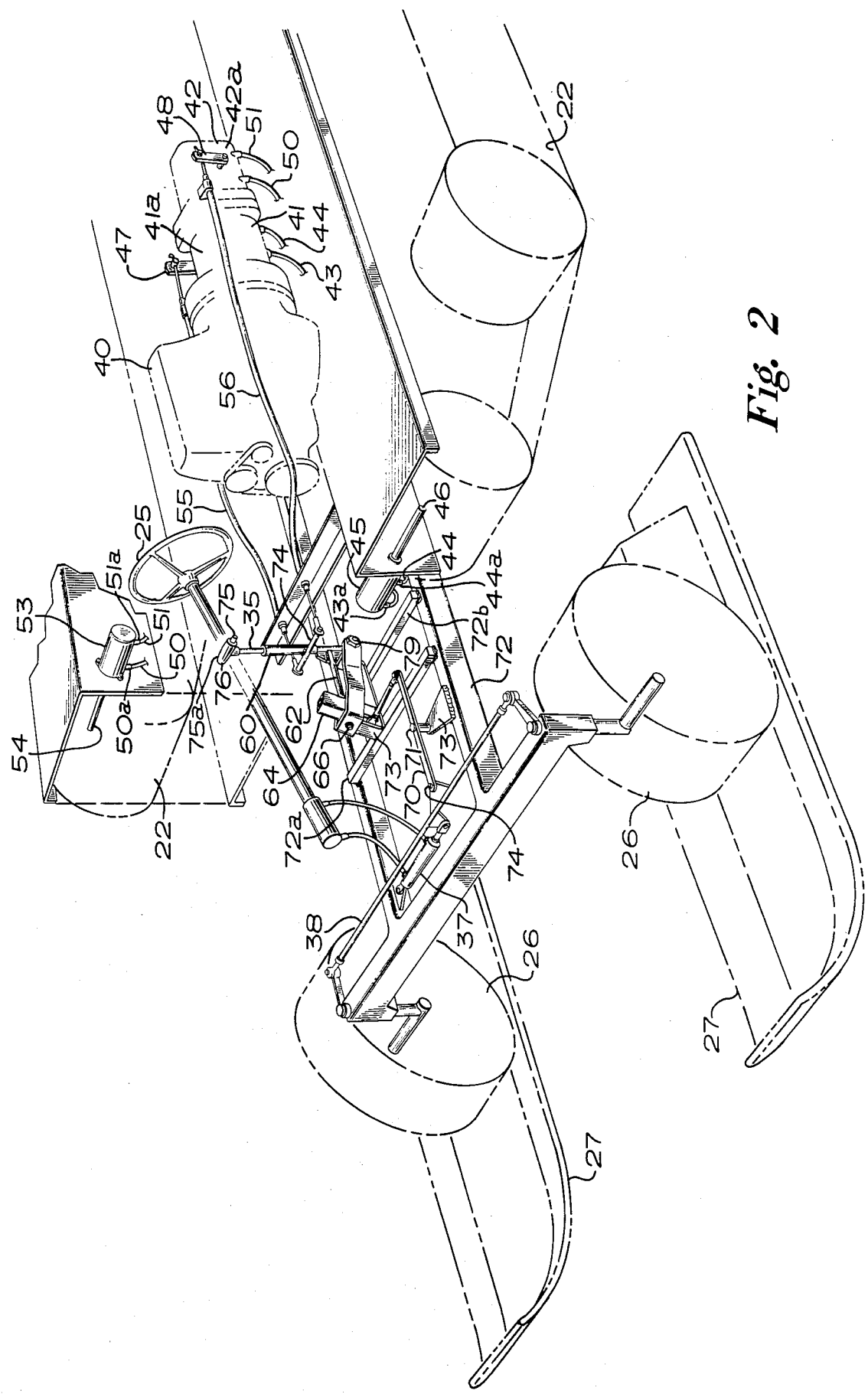
FIG. 2 is a diagramatic view of the driving and steering mechanism of an embodiment of my invention.
Figure 4:
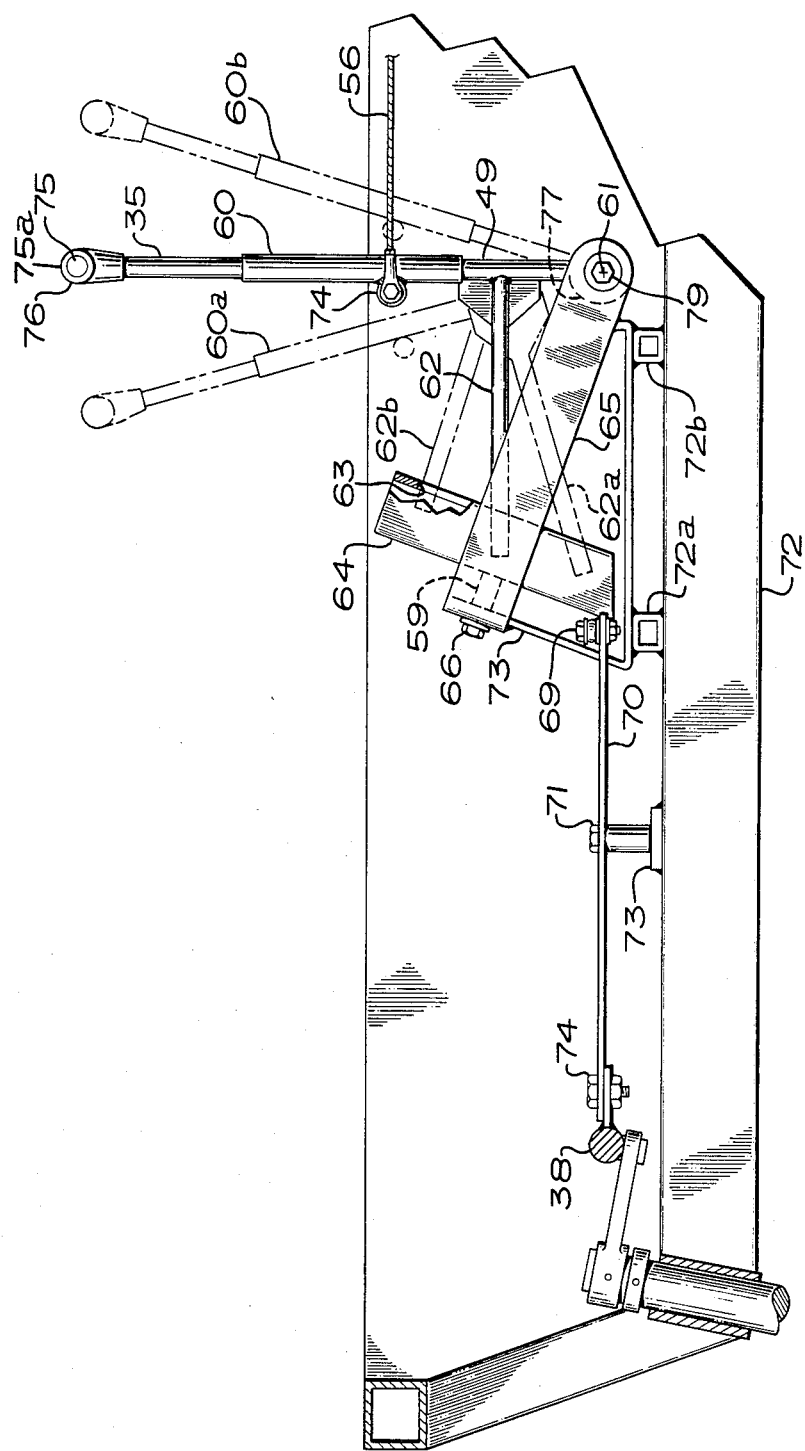
FIG. 4 is a side elevation view of the control mechanism of an embodiment of my invention.

Cables 55 and 56 are secured to a cross bar 74 that is welded to a tubular sleeve member 60. Sleeve member 60 may be thought of as the control stick and control stick 60 pivots about a horizontal axis or pivot 61 (FIG. 3). When control stick 60 is moved to position 60a, it will be seen that both cables 55 and 56 are moved forwardly in the same direction producing power equally to the two treads driven by shafts 46 and 54. That is, cables 55 and 56 each move the lever arms 47 and 48 connected to the valves and through thus the hydraulic flow through lines 43 and 44 as well as through lines 50 and 51 from pumps 41 and 42 are generally equal, thus driving the two treads 22 equally.

When control stick 60 is moved to the rear or in reverse, it assumes the position 60b and causes valves 47 and 48 to move in the reverse direction and thus change the direction of hydraulic flow through lines 43 and 44 as well as lines 50 and 51 to change the direction of rotation of shafts 46 and 54.

A forwardly extending shaft 62 is secured above pivot point 61 to the lower portion 49 of control stick 60 by suitable means such as welding and extends into a slot 63 formed in a tubular member 64 having a rectangular cross-section, the slot 63 being on the back side of tubular member 64. A stirrup member 65 has its open end secured about pivot 61 and has a bolt 65 extending through the closed face of the stirrup, opposite pivot 61, and through the side of tubular member 64 opposite slot 63 at a mid-height position. A boss 59 may be employed to insure there is no binding between the closed end of stirrup 65 and tubular member 64, where the boss 59 is used to insure the two are held apart so they don't interfere with each other, bolt 66 passing through tubular member 64 and is secured on the inside. Tubular member 64 with slot 63 formed therein through which shaft 62 extends forms an oscillating block mechanism having an axis of fluctuation at right angles to the movable handle pivot. That is, the axis of fluctuation may be said to extend generally along a line defined by shaft 62 where it moves or rotates with the lower portion 49 of control stick 60.

An adjustable linkage 67 is pivotally secured to the front bottom portion of tubular member 64 by suitable means such as a bolt 68 and has the other end thereof connected to an arm 70 by a suitable means such as a bolt 69. Another bolt 71 extending midway through arm 70 forms a pivot point secured through a bracket 73 welded to a frame member 72. The opposite end of arm 70 is secured to tie rod 38 through a suitable pivot such as a bolt 74. It will be seen that as long as tubular member 64 is transversely aligned about a vertical axis there will be no additional lengthening or shortening of cables 55 and 56. That is, as long as arm 62 remains aligned with bolt 66, there will be no change in the length of cables 55 and 56 when steering wheel 25 is rotated, because arm 62 will not move from its neutral pivot point. However, when arm 62 is moved to the most forward or rearward position suggesting more speed from the vehicle, and steering wheel 36 is turned, arm 62 will follow rotation of slot 63, when the rod 38 moves thus causing linkage 67 and arm 70 to rotate. To further aid and provide additional strength and support for bolt 66, a bracket 73 forms additional support therefore and is welded to frame members 72a and 72b.

At times it may be desirable to create the maximum amount of turning maneuverability to the vehicle and this is accomplished by depressing a deadman button 75 coupled to a lock mechanism 75a that is located transversely in a handle 76 and thus when handle 76 is unlocked and rotated with element 60 turning with respect to element 49, cross member 74 may be rotated with cables 55 and 56 being changed, and thus control the valves which dictate the flow of hydraulic fluid to the different motors and thus create the direction movement of the two treads 22 as well as the speed with which they move.

It has also been found to be advantageous to have some form of friction control over the movement of control member 60 and handle 76 and this is accomplished through the use of a bearing block 77 into which control element 49 is fitted and may be rotated. Control element 49 may be held in place by suitable means such as a screw or bolt and the bearing block 77 is fitted between the ends of stirrup 65 and is held in place by machine screws 79 and 80. That is, tightening of screws 79 and 80 creating more pressure against the end portion of bearing block 77 creates the friction needed to hold control element 60, 49, and handle 75 in place during its operation. When operated in the manner just described, those elements form a friction clutch element that help in control of the vehicle.

In considering this invention, it should be remembered that the present disclosure is illustrative only and the scope of the invention should be determined by the appended claims.

What is claimed is:

1. A control mechanism for steering an all-seasons vehicle comprising:
   (a) a pair of tread means having motors producing movement of each said tread means over the terrain traversed by the vehicle;
   (b) power means operably connected to said motors of said pair of tread means for causing movement of the same, said power means having a pair of controlable valve means controlling the flow of power to said motors;
   (c) tread control means having a movable handle pivotally connected at the bottom thereof and including an arm extended outwardly and above the bottom of said movable handle, said tread control means connected to said pair of controllable valve means;
   (d) oscillating block means having an axis of fluctuation at right angles to said movable handle pivot, said oscillating block means having slot means as a part thereof facing said movable handle through which said extended arm is disposed causing relative actuation of said valve means; and
   (e) steerable means engaging the terrain over which the vehicle moves, and communicating with said oscillating block means providing steering control for the vehicle.

2. The invention as set forth in claim 1 including:
   (f) lock means disposed on said movable handle of said tread control means permitting said movable handle to be rotated thereby causing greater flow of hydraulic fluid in said pair of valve means.

3. The invention as set forth in claim 2 including:
   (g) steering wheel means communicating with said oscillating block means to provide direct control to said steerable means independent of the position of said tread control means.

4. The invention as set forth in claim 1 including:
   (h) stirrup shaped means having a transverse axis passing through the axis of the pivot at said bottom of said movable handle;
   (i) shaft means passing through the closed end of said stirrup shaped means in alignment with said axis of fluctuation of said oscillating block means thus defining a neutral axis for said arm extended outwardly.

5. The invention as set forth in claim 1 wherein moving said tread control means forward of said axis of fluctuation increases the forward speed of said pair of tread means and moving said tread control means rearward of said axis of fluctuation increases the rearward speed of said pair of tread means.

6. The invention as set forth in claim 2 wherein said lock means may be disengaged and said movable handle rotated to control flow of hydraulic fluid in said pair of valve means while said tread control means is moved forward of said axis of fluctuation to increase the forward speed of said pair of tread means and is moved rearward of said axis of fluctuation to increase the rearward speed of said pair of tread means.

7. The invention as set forth in claim 2 wherein upon actuation of said lock means, rotation of said movable handle is permitted without a like movement of said arm.

8. The invention as set forth in claim 1 wherein said steerable means engaging the terrain shall be connected to said vehicle.

9. The invention as set forth in claim 1 wherein said tread control means includes:
   (j) a pair of extensible means secured between said movable handle and said pair of valve means, said extensible means being extended or retracted thereby causing said pair of tread means to increase or decrease their driving speed accordingly.

10. The invention as set forth in claim 1 including:
    (k) friction clutch means operably interconnected with said pivotal connection for at least matching any resistance offered by said pair of valve means.

11. The invention set forth in claim 1 wherein said motors producing movement of said tread means are hydraulically drivable and said valve means control the hydraulic flow of fluid to said motors.

12. A control mechanism for controlling the steering and speed of an all-seasons vehicle comprising:
    (a) a frame for securing all components thereto and providing a base therefor;
    (b) a pair of treads pivotally secured to said frame and moving the vehicle over the terrain selected by the operator;
    (c) a pair of hydraulic pumps having input and output ports to transmit hydraulic fluid under pressure;
    (d) a pair of hydraulic motors operably connected to said pair of treads to provide movement to said treads, and having ports to receive hydraulic fluid under pressure;
    (e) a prime mover disposed upon said frame and coupled to said pair of hydraulic pumps to provide power therefor;
    (f) a pair of controllable valves communicating with said pair of hydraulic pumps for controlling the flow of hydraulic fluid to said pair of motors;
    (g) a tread speed control having a movable handle with a pivot axis journaled to said frame at the end thereof, said handle having an arm extending outwardly and above said pivot axis, and including mechanisms being movable elements communicating with said pair of controllable valves;
    (h) an oscillating block fluctuating about an axis disposed at right angles to said pivot axis, said block having an elongated slot device communicating with said extended arm and producing relative actuation of said valve means;
    (i) terrain following mechanism secured to said frame and engaging the terrain over which the vehicle moves, said terrain following mechanism engaging said oscillating block, whereby said vehicle is steered thereby.

13. The invention as set forth in claim 12 including:
    (j) a releasable lock disposed on said movable handle of said tread speed control permitting said movable handle to be rotated thereby causing greater displacement of said controllable valves.

14. The invention as set forth in claim 12 including:
    (k) a steering wheel communicating with said oscillating block to provide direct control to said terrain following mechanism independent of the position of said tread speed control.

15. The invention as set forth in claim 12 including:
    (l) stirrup shaped element having a transverse axis passing through the axis of the pivot at said end of said movable handle;
    (m) a shaft passing through the closed end of said stirrup shaped element in alignment with said axis of fluctuation of said oscillation block thus defining a neutral axis for said arm extended outwardly.

16. The invention as set forth in claim 12 wherein moving said tread speed control forward of said axis of fluctuation increases the forward speed of said pair of treads and moving said tread speed control rearward of said axis of fluctuation increases the rearward speed of said pair of treads.

17. The invention as set forth in claim 13 wherein upon actuation of said lock means, rotation of said movable handle is permitted without a like movement of said arm.

18. The invention as set forth in claim 12 wherein said terrain following mechanism engaging the terrain shall be connected to said vehicle.

19. The invention as set forth in claim 12 wherein said tread speed control includes:
    (n) a pair of extensible elements secured between said movable handle and said pair of controllable valves, said extensible elements being extended or retracted thereby causing said pair of treads to increase or decrease their driving speed accordingly.

20. The invention as set forth in claim 12 including:
    (o) a friction clutch operably interconnected with said pivotal connection for at least matching any resistance offered by said pair of controllable valves.

* * * * *

UNITED STATES PATENT AND TRADEMARK OFFICE
CERTIFICATE OF CORRECTION

PATENT NO. : 4,616,724

DATED : Oct. 14, 1986

INVENTOR(S) : Gary Lemke

It is certified that error appears in the above-identified patent and that said Letters Patent are hereby corrected as shown below:

Column 3, Line 16   after the word "bolt" the number should be --66-- not 65.

Column 6, Line 1    the word "being" should be --having--.

Column 6, Line 29   the word "oscillation" should be --oscillating--.

Signed and Sealed this

Twenty-seventh Day of January, 1987

Attest:

DONALD J. QUIGG

Attesting Officer     Commissioner of Patents and Trademarks